United States Patent
Moglianesi

Patent Number: 5,519,459
Date of Patent: May 21, 1996

[54] DISMOUNTABLE VARIABLE INTENSITY POLARIZED LENSES

[76] Inventor: Carlos Moglianesi, 137 Springfield Ave., Summit, N.J. 07901

[21] Appl. No.: 375,308
[22] Filed: Jan. 20, 1995
[51] Int. Cl.[6] .................................................. G02C 7/12
[52] U.S. Cl. .................. 351/49; 351/47; 351/57; 351/58
[58] Field of Search .................. 351/47, 49, 57, 351/58, 84, 86, 154, 158

[56] References Cited

U.S. PATENT DOCUMENTS 3,533,686  6/1966  O'Shea ........................ 351/84
4,943,152  7/1990  Whelen ........................ 351/47

Primary Examiner—William L. Sikes
Assistant Examiner—James A. Dudek
Attorney, Agent, or Firm—William T. Hough

[57] ABSTRACT

In a preferred embodiment, glasses or spectacles of identical polarized lenses have an additional matching pair of detachably mountable separate other identical polarized lenses variably rotatable to vary intensity of the polarized light when intermittently mounted by insertion past depressable resilient locking structure and dismountable by withdrawing past the depressable resilient locking barrier structure.

8 Claims, 3 Drawing Sheets

5,519,459

DISMOUNTABLE VARIABLE INTENSITY POLARIZED LENSES

PRIOR ART

While there is no relevant prior art relative to the improvement invention disclosed herein, typical prior art is represented by permanently mounted fixed pairs of unidirectional lenses of which one thereof is variably rotatable such as illustrated in each of U.S. Pat. Nos. 2,377,313 of Casier issued Jun. 5, 1945, and 2,304,504 of Metzger et al. Dec. 8, 1942, and 4,386,832 of Naninni to a multi-part unit of several separate parts required to be assembled to lock-in non-detachable revolvable lenses there by a lever mechanism.

BACKGROUND TO THE INVENTION

The most relevant area of use of the present invention being as sunglasses worn heretofore normally for merely desired appearance and style on the beach and elsewhere for a sporting appearance, more recently there has arisen a surging public awareness of the importance of shielding the eyes from high intensity sunlight especially during summer season(s) and/or in tropical surroundings, and of also utmost importance, during securing of sun-lamp tanning exposure.

Apart from the hygiene aspect of having one's own sunglasses, to avoid transmittal of eye potential diseases by use of another persons and/or glasses provided in tanning shops, complicated and/or single unit (non-detachable) lense type units exhibit a variety of problems and/or disadvantages, the most apparent one being that when moving from out-of-doors to indoor environment for an intended longstay, normally it is both a nuisance and hindrance for the darkening second lense to continue to be a part of the worn spectacles; however, as exhibited by the foregoing prior art, there heretofore has not existed any mounting mechanism characterized by both having rotatable advantages together with easy detachment of one of the paired lenses.

Likewise, heretofore in order to arrive at an adjustably rotatable (revolvable) lense, complicated and restrictive mounting structures have been required as evidenced by the aforestated prior art patents, concurrently defeating any heretofore realistic possibility of having an easily detachable and easy mountable revolvable lense for glasses otherwise suitable for indoor wear where light glare does not exist.

OBJECTS OF THE INVENTION

Accordingly, objects of the present invention include the overcoming and/or avoiding one or more of the aforestated problems, difficulties and/or disadvantages existing prior to the present invention.

More particularly, a primary object is to provide one or more pairs (two pairs being in the form of glasses or spectacles), characterized by easy and/or simple and/speedy insertion and/or detachment/removal of a unidirectional lens from each one or more pairs of lenses, the pair including the two serially consecutive polarized lenses in face to face relationship with one thereof revolvable.

Another object is to achieve and obtain a mounting of one or more pairs of consecutive unidirectional lenses of which one of each pair is revolvable, characterized by "both" ease of mounting and dismounting "together with" ease and simplicity of mechanism of one of the lenses of each pair being easily and simply revolvable by a non-professional person wearing the pair(s) of glasses.

Another object is to obtain such a striking simplicity of parts and operation of one or more pairs of polarized lenses, especially such as in polarized glasses, as to significantly reduce cost(s) of hardware and assemblying and packaging by commercial manufacturers, as to enable low cost of production and manufacture, together with the eventual low price thereof to the needy public, thereby enhancing the probability of affording needed protection of the eyes of a major proportion of the population at risk from sun glare.

Other objects become apparent from preceding and following disclosure.

SUMMARY OF THE INVENTION

In accord with and responsive to foregoing objects, the invention for at-least a pair of aligned or alignable unidirectional lenses in face to face serial alignment, broadly includes a resiliently depressable locking member mountable on and including a) lense support structure, b) a revolvable detachable lense or c) a non-revolable detachable lense, of a pair of unidirectional lenses of which one is stationary and one is rotatably adjustable to result in variably increase or alternately decreased intensity of unidirectional single plane light passing serially through by intermittent varying the degree of rotation of the rotatable lense while both lenses are in a mounted state. The resilient depressible locking member acts as a barrier intermittently restraining a mounted detachable lense until the lense is physically moved depressingly against the resilient locking member to thereby depress it while removing the lense from its mounted position.

Because the resilient depressible locking member exerts significant restrictive pressure on any part of the detachable lense being inserted solely during the alternate intermittent times of insertion and subsequent withdrawal (dismounting thereof), the lense is held in a sturdy but "loose" fit in its mounted state, enabling easy manipulation thereof to cause it to revolve in its seated state, solely responsive to light finger revolving pressure, to the extent desired and in the direction desired. Yet, with equal ease, the lense is dismountable and may be stored within a lense storage compartment of a portable glasses case. Accordingly, in the preceding and following embodiments, it should be self apparent that the resilient depressible locking member is absolutely critically essential and necessary to the operation and functioning of the present invention.

More particularly, the prior art broadly includes a polaroid light-limiting apparatus having at-least a first one pair of supported serially arranged first and second lenses in face-to-face relationship in substantially close proximity to one-another, of which one lense of said first and second lenses is rotatably adjustable around a substantially perpendicular axis of the one lense relative to a substantially nonrotatable remaining other one lense such that single plane light passable serially through the first and second lenses is variable in degree of light intensity by an intermittent variable extent of rotation of said one lense.

As an improvement on the aforestated prior art in combination therewith, the improvement additionally includes first lense-support structure mountable and nonrevolvably supportable of the aforestated nonrotational remaining other one lense and mountable and revolvably supportable of said one lense.

First male mateable structure and first female mateable structure have different ones thereof mounted on the first lense-support structure and detachably mountable of one of the first one pair. The first male mateable structure(s) (and mechanism(s) thereof) and the first female mateable structure(s) (and mechanism(s) thereof) jointly provide for being intermittently mateable with and detachable from one-another. At least one of the first male mateable structure(s) (and mechanism(s) thereof) and the first female mateable structure(s) (and mechanism(s) thereof) is mounted on one of the one lens and the remaining other one lense and the lense support structure, and a remaining other one of the first male matable structure(s) (and mechanism(s) thereof). The first female mateable structure(s) (and mechanism(s) thereof) is mounted on a remaining one of the first one lense and the remaining other one lense and the first lense-support structure. At-least one of the first female mateable structure(s) (and mechanism(s) thereof) and the first male mateable structure(s) (and mechanism(s) thereof) includes a critically necessary (indispensable) first resilient locking structure(s) (and mechanism(s) thereof) which is intermittently depressable and resiliently self-extendable before and subsequent to each of acts of insertion and removal of the first male mateable structure(s) (and mechanism(s) thereof) into and from the first female mateable structure(s) (and mechanism(s) thereof); the first resilient locking structure(s) is positioned to be intermittently depressable by at least one of the first female mateable structure(s) (and mechanism(s) thereof) and the first male mateable structure(s) (and mechanism(s) thereof). Thereby depressing of the first resilient locking structure(s) (and mechanism(s) thereof) during alternate mounting and dismounting of the first male mateable structure(s) (and mechanism(s) thereof) and the first female mateable structure(s) (and mechanism(s) thereof) is made possible or enhanced during each of acts of insertion and removal of the first male mateable structure(s) (and mechanism(s) thereof) from the first female mateable structure (s) (and mechanism(s) thereof).

Once the second detachable lense of this invention is mounted into place, revolving-direction light pressure by one or more fingers on the lense and/or edge structure thereof or appended thereto causes the loosely held lense to revolve to the extent and distance manually manipulated for the particular mounted revolvable lense.

In a first preferred embodiment, as a further improvement on the foregoing broad improvement invention, the first female mateable structure(s) (and mechanism(s) thereof) includes a first circumscribing edge structure defining a receptacle and concurrently the locking structure(s) (and mechanism(s) thereof) includes a resilient O-ring mounted within the receptacle.

In a second preferred embodiment as a further improvment on the foregoing broad improvement on the foregoing improvement invention, the first female mateable structure(s) (and mechanism(s) thereof) include circumscribing edge structure forming a receptacle; in this embodiment, the receptacle has mounted therein the resilient locking structure(s) (and mechanism(s) thereof) and the receptacle is of a shape receivable of the male mateable structure(s) (and mechanism(s) thereof).

In a third preferred embodiment as a further improvement on the foregoing broad improvement, the female mateable structure(s) (and mechanism(s) thereof) include circumscribing edge structure forming a receptacle and concurrently the circumscribing edge includes at-least two spaced-apart projections at-least partially forming the receptacle. The receptacle has mounted therein the resilient locking structure(s) (and mechanism(s) thereof) and the receptacle is of a shape receivable of the male mateable structure(s) (and mechanism(s) thereof).

In a fourth preferred embodiment, as a further improvement on the foregoing broad invention, the female mateable structure(s) (and mechanism(s) thereof) include circumscribing edge structure includes at-least two spaced-apart ones of the resilient locking structure(s) (and mechanism(s) thereof) of shapes and positioned to mateably receive the male mateable structure(s) (and mechanism(s) thereof).

In a fifth preferred embodiment, as a further improvement on the foregoing broad invention, there is included as a functional part of the combination a second pair of supported serially arranged third and fourth lenses in face-to-face relationship in substantially close proximity to one-another. Comparably, a second one lense of the third and fourth lenses is rotatable adjustable around a substantially perpendicular axis of the second one lense relative to a substantially nonrotatable second remaining other one lense. Thereby single plane light passable serially through the third and fourth lenses is variable in degree of light intensity by an intermittent variable extent of rotation of the second one lense. Also comparably there is included a second lense-support structure mountable and nonrevolvably supportable of the second other one lense and mountable and revolably supportable of the second one lense, and second male mateable structure. Also comparably, a second female mateable structure has different ones thereof mounted on the second lense-support structure and detachably mountable of one of the second one pair, the second lense-support structure with the second male mateable structure(s) (and mechanism(s) thereof) and second female mateable structure(s) (and mechanism(s) thereof) jointly being intermittently mateable with and detachable from the second male mounting structure(s) (and mechanism(s) thereof). Likewise, at least one the second female mateable structure(s) (and mechanism(s) thereof) and the second male mateable structure(s) (and mechanism(s) thereof) is mounted on the second one and the second remaining other one lense and the lense support structure, and a remaining other of the second male mateable structure(s) (and mechanism(s) thereof); Likewise, the second female mateable structure(s) (and mechanism(s) thereof) is mountable on a remaining one of the second one lense and the second remaining other one lense and the second lense-support structure. Likewise at least one of the second female mateable structure(s) (and mechanism(s) thereof), and the second male mateable structure(s) (and mechanism(s) thereof) includes a second resilient locking structure(s) (and mechanism(s) thereof) for being intermittently depressable and resiliently self-extendable before and subsequent to each of acts of insertion and removal of the second male mateable structure(s) (and mechanism(s) thereof) into and from and for being positioned to be depressible by at least one of the second female mateable structure(s) (and mechanism(s) thereof) and the second male mateable structure(s) (and mechanism(s) thereof). Likewise, accordingly for this second pair of lenses, it is possible to depress the second resilient locking structure(s) (and mechanism(s) thereof) during alternate mounting and dismounting of the second male mateable structure(s) (and mechanism(s) thereof) and the second female mateable structure(s) (and mechanism(s) thereof) during the intermittent opposite acts of insertion and removal of the second male mateable structure(s) (and mechanism(s) thereof) from the second female mateable structure(s) (and mechanism(s) thereof).

In sixth through ninth preferred embodiments, there are comparable additional improvements to the second pair of lenses as set-forth above, corresponding to the forging improvement of to the broad invention for the improvement of the aforestated first through fourth preferred embodiments.

In a tenth preferred embodiment to the fifth preferred embodiment, there is included in combination a multicompartmented spectacle-mounting case, preferably portable, inclusive of an elongated compartment for spectacle storage and a lense-size compartment of a size and shape storable of at-least one the the one lense and the second one lense.

In an alternate broad embodiment of the invention, as a part of a prior art unidirectional light-limiting apparatus having at-least a first one pair of supported serially arranged first and second unidirectional lenses aligned or alignable unidirectional lenses in face to face serial alignment, the improvement includes a resiliently depressable locking member. The locking member is mounted or mountable on at least one of and includes all of a) lense support structure, b) a revolvable detachable lense or c) a non-revolable detachable lense of a pair of polarized lenses of which one thereof is stationary and a remaining one thereof is rotatably adjustable to result in variably increased or alternately decreased intensity of polarized single plane light passing serially through by intermittent varying the degree of rotation of the rotatable lense while/when both lenses are in a mounted state.

It should be noted that because for the present invention, for a glasses/spectacles embodiment having "two" pairs joined with the detachable lenses are mounted, both lenses are of typically and normally a round shape, and both are identical in shape, making it a simple matter to mount a pair of lenses, not being relevant which goes with which side of the glasses.

The invention may be better understood by reference to the drawings of the following figures.

THE FIGURES

FIG. 1 diagrammatically and symbolically illustrates a front view of glasses of the present invention with the rotatable lenses mounted as a part thereof.

FIG. 2 diagrammatically and symbolically illustrates a view of the glasses of FIG. 1, as taken along line 2—2 of FIG. 1, shown in exploded view insofaras the detachably mountable unidirectional lenses thereof.

FIG. 3 diagrammatically and symbolically illustrates in a view comparable to that of FIG. 2, an alternate embodiment of the invention.

FIG. 4 diagrammatically and symbolically illustrates in a view comparable to that of FIG. 2, another alternate embodiment of the invention.

FIG. 5 diagrammatically and symbolically illustrates in a view comparable to that of FIG. 2, another alternate embodiment of the invention.

FIG. 6 diagrammatically and symbolically illustrates in a view comparable to that of FIG. 2, for the embodiment illustrated in FIG. 1, another alternate embodiment of the invention.

FIG. 7 diagrammatically and symbolically illustrates in side and top perspective exploded view, the glasses of FIG. 1 devoid of any mounted detachable revolvable unidirectional lenses, the glasses and the separate aligned two detached revolvable unidirectional lenses being aligned with the separate lense-storage compartment of a carrying compartmented case, and with the glasses aligned with the separate glasses storage compartment.

DETAILED DESCRIPTION

With reference to the foregoing Figures, while the primary invention contemplates the use of two pairs of lenses as previously described, in the form of typically shady glasses, it is likewise contemplated that for a microscope or telescope or the like, that a single pair may be used with comparable advantages set-forth above.

Figure 1:
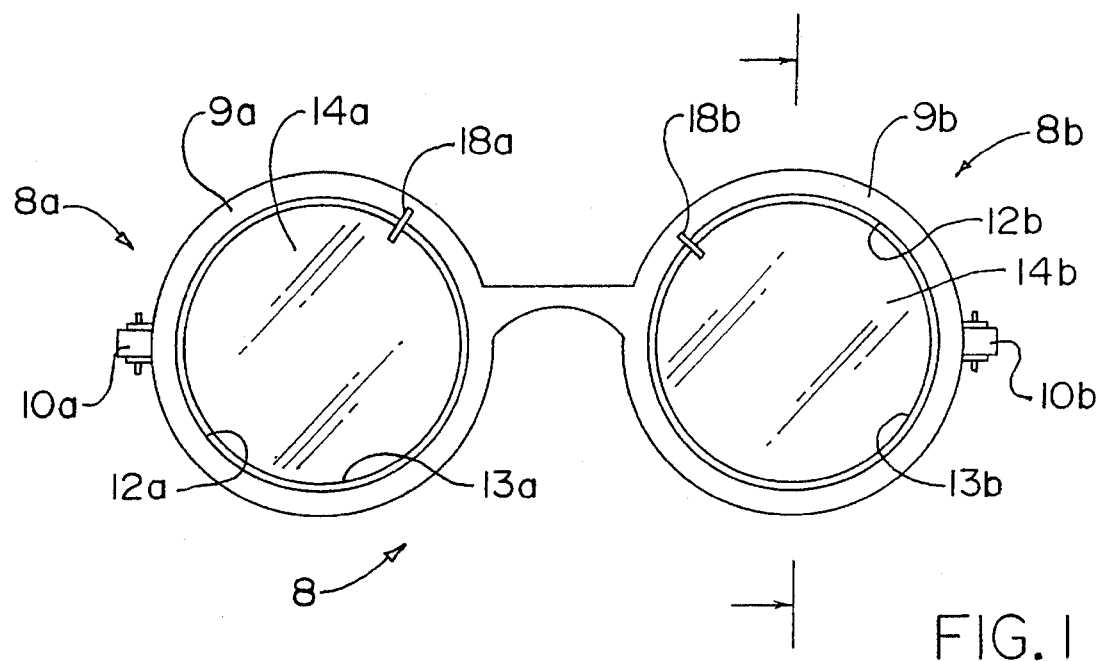

FIG. 1 discloses glasses 8 having the right set of lense cummulatively designated by right lense annular support 9a and left lense annular support 9b connected by the nose-support bar 11, with the mounted detachably mountable rotatable lenses 14a and 14b repectively held in place by the annular front edges 12a and 12b respectively retaining the resilient elements 13a and 13b respectively—in this embodiment the resilient elements 13a and 13b respectively being mounted on the radial inwardly faces of the annular front edges 12a and 12b respectively. The retaining barrier is the mounted (adhered) resilient element 13a, illustrated in this FIG. 1 embodiment as an annular ring 13a or other annular resilient member.

Figure 2:
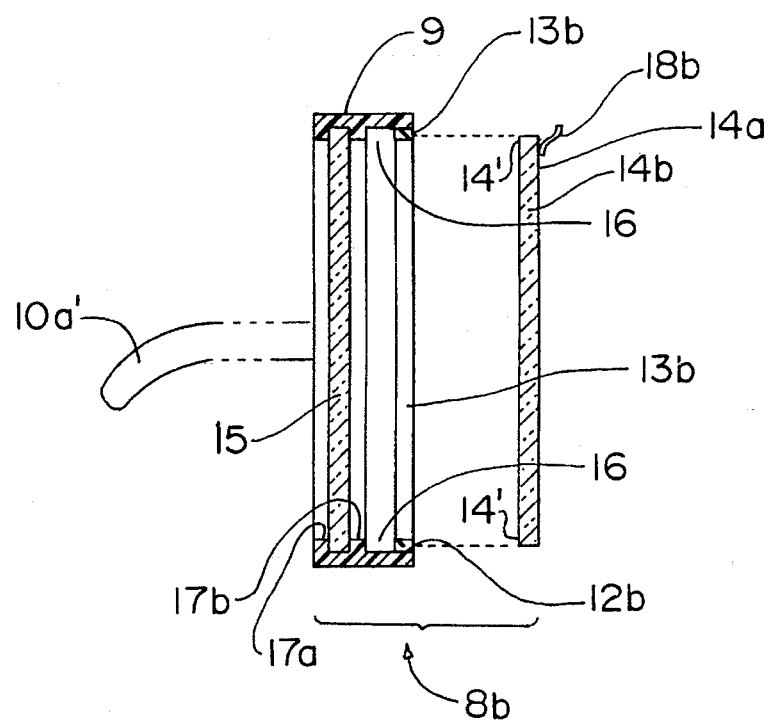

As illustrated in FIG. 2, the detachably mountable and revolvable lense is mountable by virtue of the resilient O-ring or other resilient member 13b being at-least partially depressable when pressing the detachably mountable lens 14b is pressed rearwardly into the seating dip/gap 16 located just beyond the mounted annular ring 13b or equivalent other-shaped resilient composition. Attached to opposite ends of the glasses are the conventional type mounted support 10a and 10b of which terminal ends thereof (not shown in this view) conventionally rest on opposite ends to assist in the conventional wearing of the glasses. The non-rotatable permanently mounted lense 15 is mounted non-removably by the flanges 17a and 17b of the lense annular support 9. The mounted revolvable lenses is/are easily revolvable by use of mere finger pressure, or alternately by the optional adheared (or otherwise attached) radially outwardly positioned handle 18b, or the like.

Figure 3:
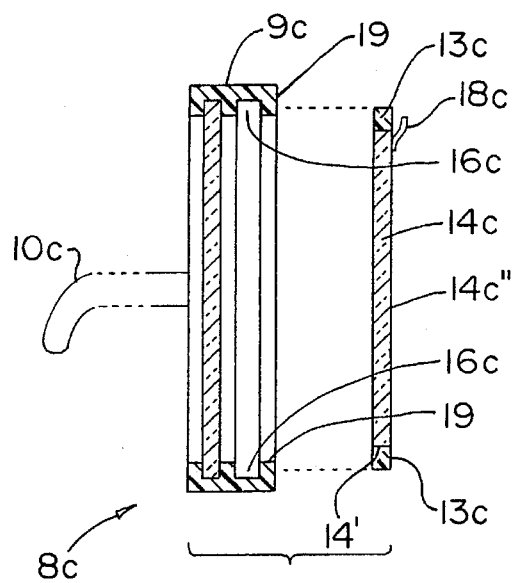

The FIG. 3 different embodiment corresponds substantially to that of the FIG. 2 embodiment, except that in this embodiment there is the integral hard plastic lip 19, with the resilient member 13c being mounted on the outer circumsicibing edge (or at least to extend radially outwardly beyond that outer edge 14', such that it is depressable when the lense 14c is pressed past the lip 19. The handle 18c (optional) to aid in revolving the lense 14c, is typically mounted on a radially outward location of the lense face 14c".

Figure 4:
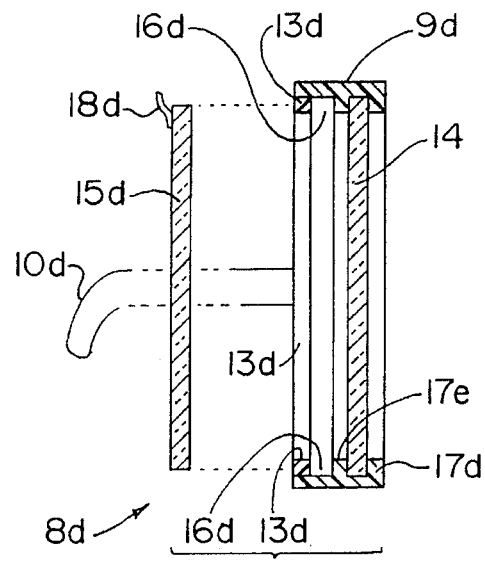

FIG. 4 other different embodiment is substantially a mirror image to that of the FIG. 2 embodiment, except that it is here the rearward lense(s) that is/are detachably mountable and revolvable.

Figure 5:
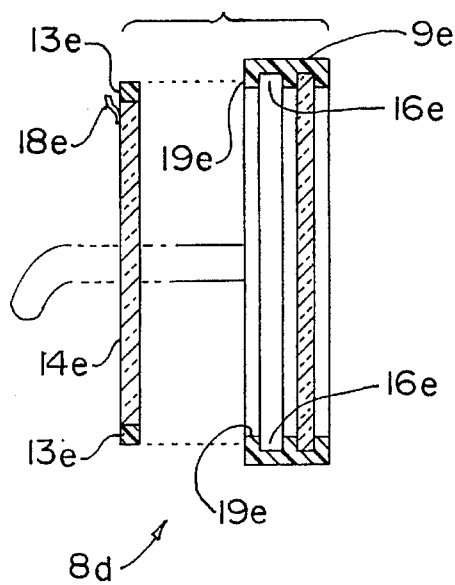

FIG. 5 still other different embodiment is substantially a mirror image to that of the FIG. 3a embodiment, except that it is here the rearward lense(s) (like in FIG. 4 embodiment) that is/are detachably mountable and revolvable.

Figure 6:
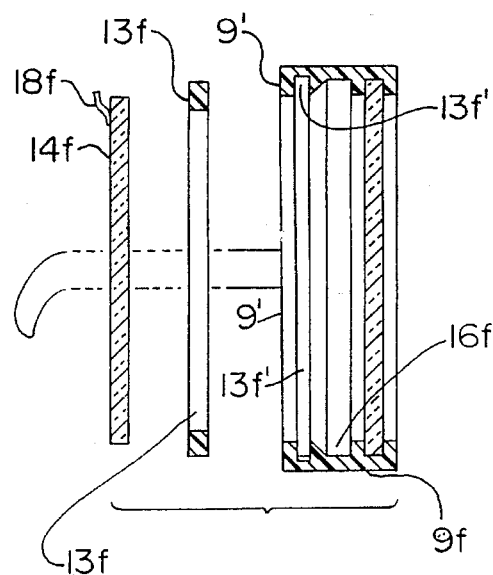

FIG. 6 diagrammatically and symbolically illustrates in a view comparable to that of FIG. 2, except here clearly for an O-ring, shown in its exploded view. The O-ring (resilient member) 13f is seatable (by light finger-pressure) initially within the recess 13f of the frame structure 9f—where it remains seated (and optionally may be adhered), where the inner edge thereof becomes depress during each of the insertion and withdrawal of the detachable and revolvable lense 14f, that becomes seated in the recess 16f.

It is noted that in each embodiment, the handles 18a through 18f serve a multiple function, one of facilitating the revolving of the revolvably mounted lense(s), and secondly to facilitate the easy removal (detachment) of the lense(s) by merely a forwardly (or rearwardly—as the case may be) pulling action sufficient to pull the detachable lense past the resilient member.

Figure 7:
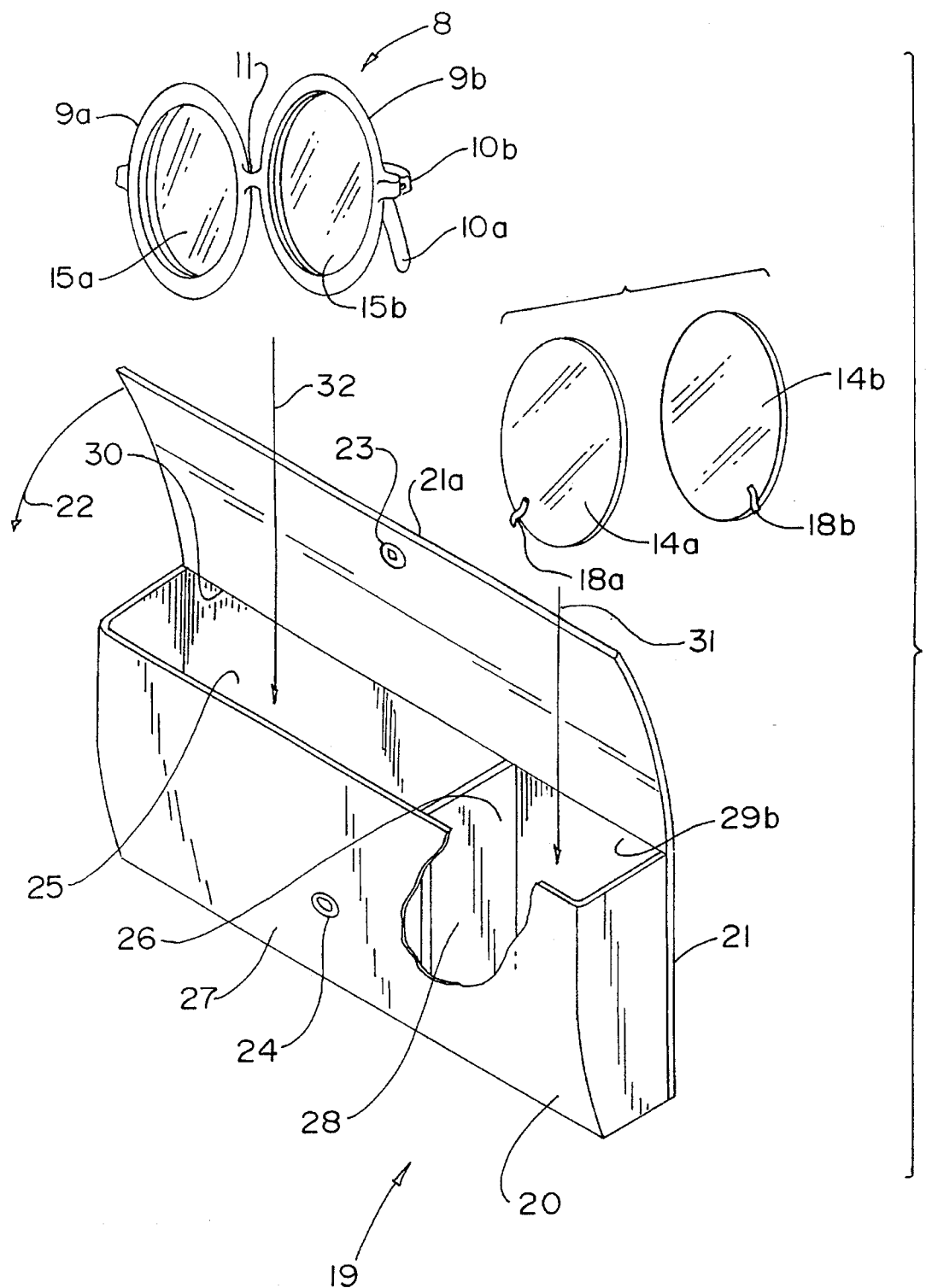

FIG. 7 in the illustrating of a typical kit-combination the polaroid glasses of FIG. 1 (for example), in the glasses-state of being devoid of any mounted detachable revolvable unidirectional lenses, the glasses 8 and the separate aligned two detached revolvable unidirectional lenses 14a and 14b are illustrated as being aligned with the separate glasses-storage compartment space 25 and the lense(s)-storage compartment space 26 of a carrying compartmented case 19, showing in exploded view the glasses 8 aligned with the separate glasses storage compartment space 25 and the face-to-face lenses 14a and 14b in exploded view aligned with the lense storage space 26. The storage case 19 has its forward side 27, and rearward side 21 of which the flexable lid 21a is an extension, and the direction of lid movement 22 for the closing thereof, and the female closing-snap element and the male closing-snap element, and the compartment separation wall 28, the overal bottom compartment casing portion 20, and the inner back face(s) 29a and 29b to the separate storage compartments, and the lid-crease line for the opening and closing of the lid 21a. The exploded-view dismounted lenses 14a and 14b are mounted in its/their compartment space 26 as aligned in direction 31, and the glasses as aligned in direction 30 for storage in the compartment space 25.

It is within the scope and comtemplation of this invention to make such variations and modifications and substitution of equivalents as would be obvious to an ordinary artisan in this particular art.

I claim:

1. In a polaroid light-limiting apparatus having at-least a first one pair of supported serially arranged first and second lenses in face-to-face relationship in substantially close proximity to one-another, of which one lense of said first and second lenses is rotatably adjustable around a substantially perpendicular axis of the one lense relative to a substantially nonrotatable remaining other one lense such that single plane light passable serially through the first and second lenses is variable in degree of light intensity by an intermittent variable extent of rotation of said one lense, the improvement being a combination comprising: first lense-support structure mountable and nonrevolvably supportable of said nonrotational remaining other one lense and mountable and revolvably supportable of said one lense, and first male mateable structure and first female mateable structure having different ones thereof mounted on said first lense-support structure and detachably mountable of one of said first one pair, and said first male mateable means and said first female mateable means jointly for being intermittently mateable with and detachable from one-another, at least one of said first male mateable means and said first female mateable means being mounted on one of said one lense and said remaining other one lense and said lense support structure, and a remaining other one of said first male matable means and said first female mateable means being mounted on a remaining one of said first one lense and said remaining other one lense and said first lense-support structure, said first male mateable means including first resilient locking means for being intermittently depressable and resiliently self-extendable before and subequent to each of acts of insertion and removal of said first male mateable means into and from said first female mateable means, being positioned to be intermittently depressable by at least one of said first female mateable means and said first male mateable means such that depressing of the first resilient locking means during alternate mounting and dismounting of said first male mateable means and said first female mateable means is made possible or enhanced during each of acts of insertion and removal of said first male mateable means from said first female mateable means.

2. The improvement of claim 1, in which said first female mateable means includes a first circumscribing edge structure defining a receptacle and in which said locking means includes a resilient O-ring mounted on said first circumscribing edge within said receptacle.

3. The improvement of claim 1, in which said female mateabe means includes circumscribing edge structure that includes at-least two spaced-apart ones of said resilient locking means of shapes and positioned to mateably receive said male mateable means.

4. The improvement of claim 1, including a second pair of supported serially arranged third and fourth lenses in face-to-face relationship in substantially close proximity to one-another, of which a second one lense of said third and fourth lenses is rotatable adjustable around a substantially perpendicular axis of the second one lense relative to a substantially nonrotatable second remaining other one lense such that single plane light passable serially through the third and fourth lenses is variable in degree of light intensity by an intermittent variable extent of rotation of said second one lense, and including a second lense-support structure mountable and nonrevolvably supportable of said second other one lense and mountable and revolably supportable of said second one lense, and second male mateable structure and second female mateable structure having different ones thereof mounted on said second lense-support structure and detachably mountable of one of said second one pair, said second lense-support structure and said second male mateable means and second female mateable means jointly being for intermittently mateable with and detachable from said second male mounting means, at least one said second female mateable means and said second male mateable means being mounted on said second one and said second remaining other one lense and said lense support structure, and a remaining other of said second male mateable means and said second female mateable means being mountable on a remaining one of said second one lense and said second remaining other one lense and said second lense-support structure, at least one of said second female mateable means, and said second male mateable means including a second resilient locking means for being intermittently depressable and resiliently self-extendable before and subsequent to each of acts of insertion and removal of said second male mateable means into and from and for being positioned to be depressible by at least one of said second female mateable means and said second male mateable means such depressing of said second resilient locking means during alternate mounting and dismounting of said second male mateable means and said second female mateable means is made possible or enhanced during each of acts of insertion and removal of said second male mateable means from said second female mateable means.

5. The improvement of claim 4, in which said female mateable means includes circumscribing edge structure defining a receptacle and in which said locking means includes a resilient O-ring mounted within said receptacle.

6. The improvement of claim 4, in which said female mateabe means includes circumscribing edge structure includes at-least two spaced-apart ones of said resilient locking means of shapes and positioned to mateably receive said male mateable means.

7. The improvement of claim 4, including a multicompartmented spectacle-mounting case inclusive of an elongated compartment for spectacle storage, and a lense-size compartment of a size and shape storable of at-least one said said one lense and said second one lense.

8. In a unidirectional light-limiting apparatus having at-least a first one pair of supported serially arranged first and second unidirectional lenses alinged or alignable polarized lenses in face to face serial alignment, the improvement includings a resiliently depressable locking member mounted or mountable on at least one of and including all of a) lense support structure, b) a revolvable detachable lense or c) a non-revolable detachable lense of a pair of polarized lenses of which one thereof is stationary and a remaining one thereof is rotatably adjustable to result in variably increased or alternately decreased intensity of polarized single plane light passing serially through by intermittent varying the degree of rotation of the rotatable lense while both lenses are in a mounted state.

* * * * *